M. W. GILMARTIN & M. WOGAN.
PAWL AND RATCHET MECHANISM.
APPLICATION FILED JULY 21, 1914.
1,178,395.
Patented Apr. 4, 1916.
3 SHEETS—SHEET 1.
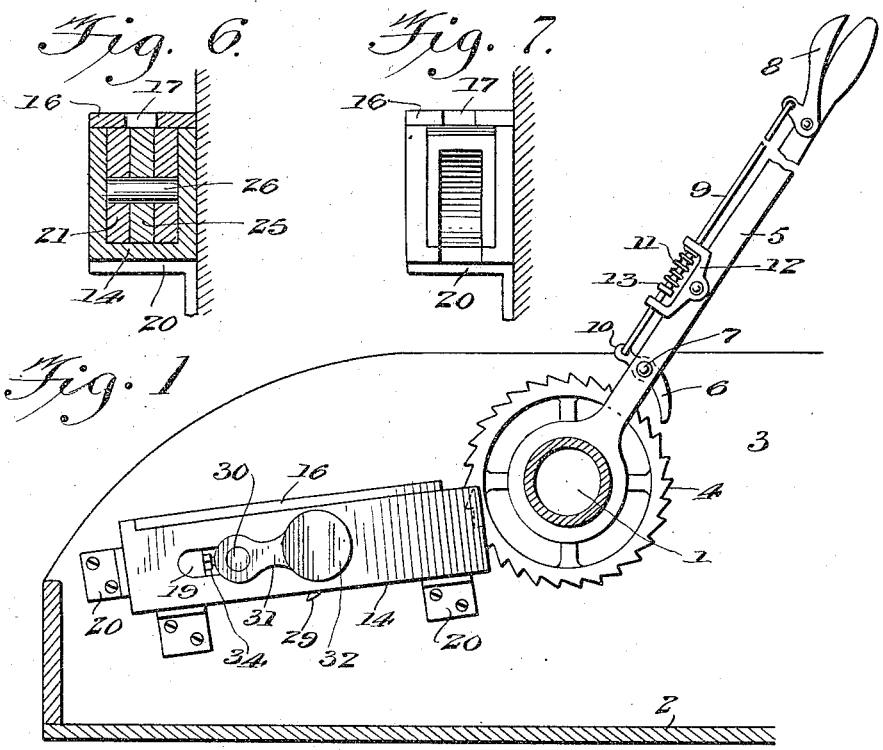
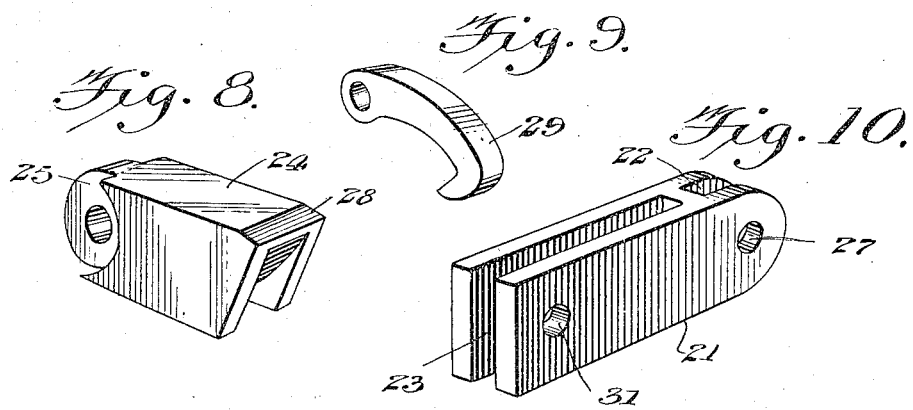
Witnesses
W. S. McDowell
J. W. Garner
Inventors
Michael W. Gilmartin
Michael Wogan
By Victor J. Evans
Attorney

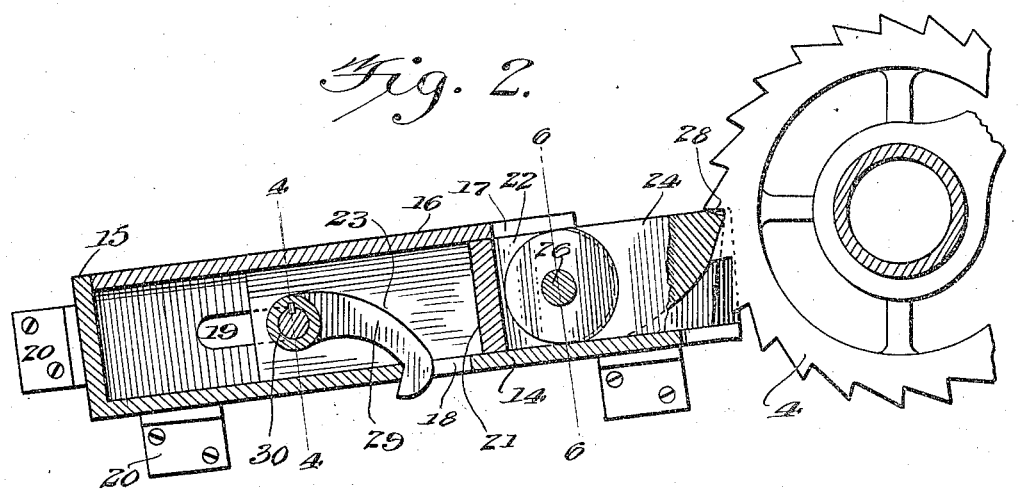
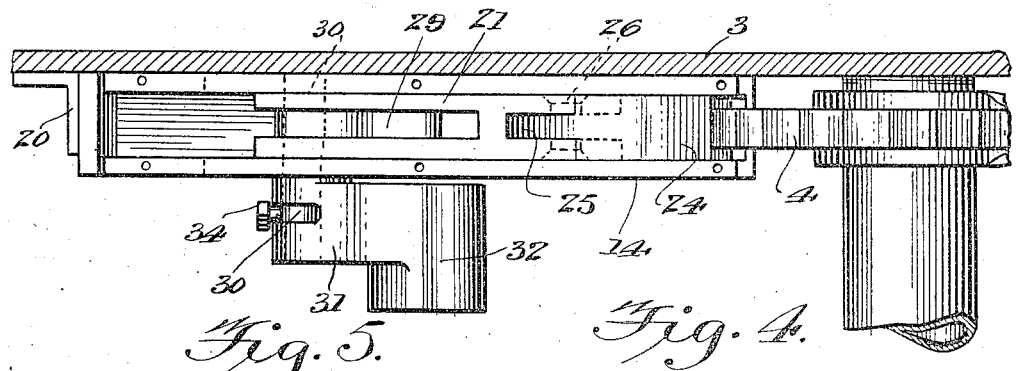
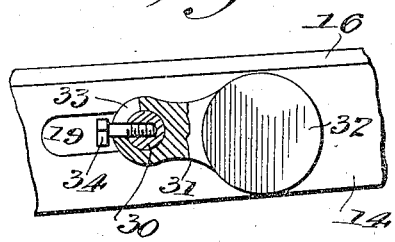
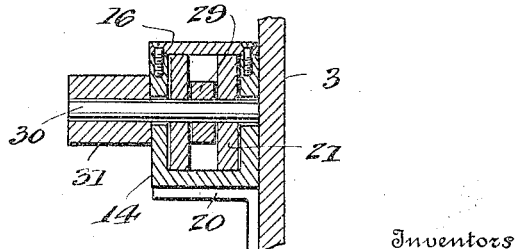

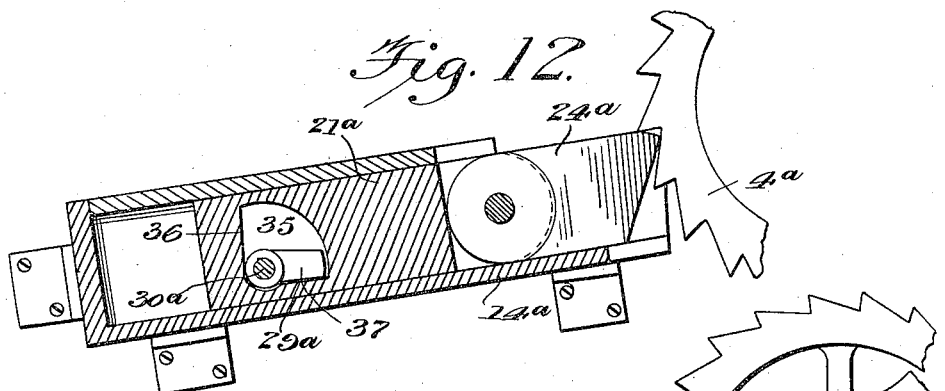
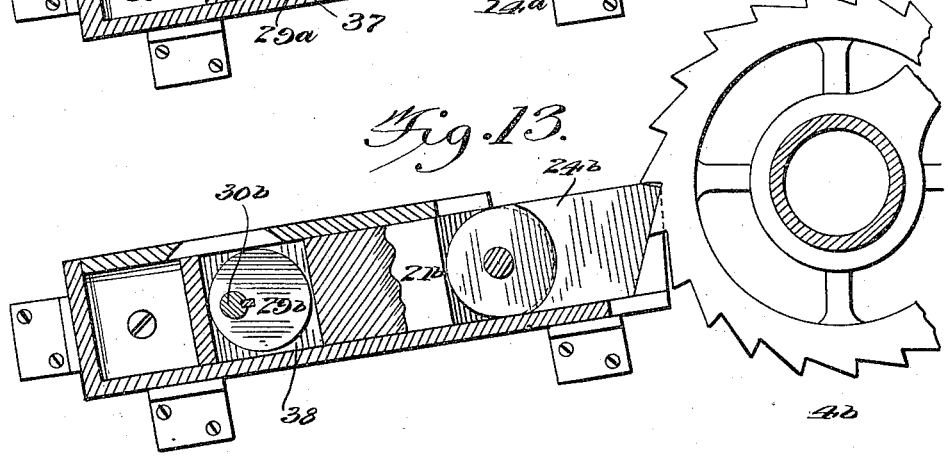
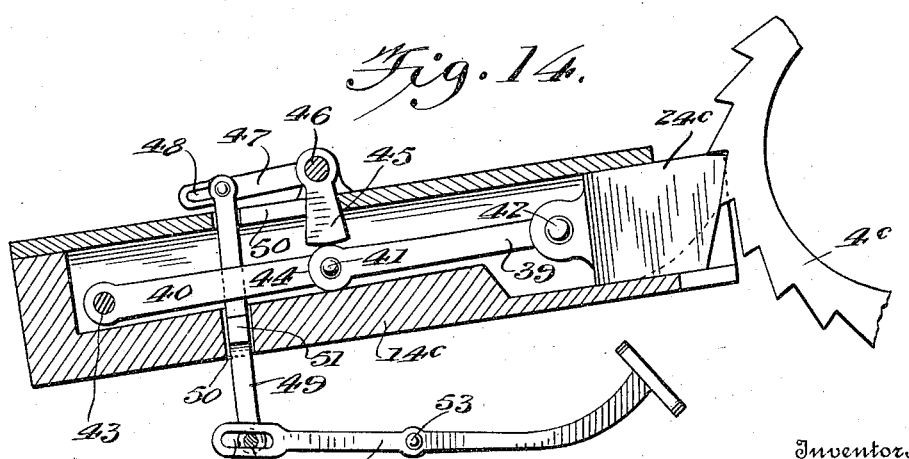

UNITED STATES PATENT OFFICE.

MICHAEL W. GILMARTIN AND MICHAEL WOGAN, OF PHILADELPHIA, PENNSYLVANIA.

PAWL-AND-RATCHET MECHANISM.

1,178,395.  Specification of Letters Patent. Patented Apr. 4, 1916.

Application filed July 21, 1914. Serial No. 852,229.

*To all whom it may concern:*

Be it known that we, MICHAEL W. GILMARTIN and MICHAEL WOGAN, citizens of the United States, residing at Philadelphia, in the county of Philadelphia and State of Pennsylvania, have invented new and useful Improvements in Pawl-and-Ratchet Mechanisms, of which the following is a specification.

This invention relates to improvements in pawl and ratchet mechanism such for instance as is used for raising and lowering the hinged or pivoted bottom of a dump wagon or the like, the object of the invention being to provide means for controlling the pawl and ratchet mechanism so as to hold the same against retrograde rotation and to release the pawl and ratchet mechanism when it is desired to operate the same, the invention consisting in the construction, combination and arrangement of devices hereinafter described and claimed.

In the accompanying drawings:—Figure 1 is a side elevation of a pawl and ratchet mechanism constructed in accordance with our invention, showing the same arranged for use in a dump wagon having a pivoted bottom, the dump wagon and the winding shaft of the pawl and ratchet mechanism being shown in section. Fig. 2 is a vertical longitudinal sectional view of the same. Fig. 3 is a plan of the same with one side wall of the wagon bed indicated in section. Fig. 4 is a vertical transverse sectional view on the plane indicated by the line 4—4 of Fig. 2. Fig. 5 is a detail elevation, partly in section, of the weight lever for controlling the detent. Fig. 6 is a vertical transverse sectional view on the plane indicated by the line 6—6 of Fig. 2. Fig. 7 is an end elevation of the carrier, the dog and the guide in which they are mounted. Fig. 8 is a detail perspective view of the dog. Fig. 9 is a similar view of the detent. Fig. 10 is a similar view of the carrier. Fig. 11 is a similar view of the weight lever. Fig. 12 is a vertical longitudinal sectional view of a modified form of our invention. Fig. 13 is a similar view of another modified form of our invention. Fig. 14 is a similar view of another modified form of our invention.

Referring especially to the form of the invention shown in Figs. 1—2—3 and for the purposes of this specification, a winding shaft 1 for winding a chain to raise the hinged bottom 2 of a dump wagon such as is shown at 3, is provided with a ratchet wheel 4 which is keyed or otherwise securely fastened thereto. A lever 5, to be operated manually, is pivotally mounted on the winding shaft and is provided with a pawl 6 which is pivoted at 7, the shaft being also provided with a hand grip 8 for operating the pawl and a rod 9 which connects the hand grip to a rearwardly extending arm 10 with which the pawl is provided. A coiled spring 11 is arranged on the rod 9 and one end of said spring bears against an arm of a guide 12, the other end of the spring bearing against a stop 13 which is secured on the rod. This spring exerts its tension to normally disengage the pawl from the ratchet wheel. The operator when he grips the handle of the lever and the hand grip manipulates the latter to engage the pawl with the ratchet wheel and by moving the lever back and forth rotates the ratchet wheel by step by step movement and correspondingly rotates the winding shaft 1 as will be understood.

While we here show the pawl and ratchet mechanism arranged for use in a dumping wagon we would have it understood that the pawl and ratchet mechanism may be used for various other purposes and we would not desire to be limited in this particular.

Our invention relates especially to controlling mechanism for the pawl and ratchet mechanism to coact with the ratchet wheel to lock the latter against retrograde rotation and to release it when it is desired to operate the same by means of the lever and pawl.

In the embodiment of our invention we provide a guide 14 which is arranged with one end open and opposed to one side of the ratchet wheel, the opposite end of the guide being closed as at 15. The guide is provided with a removable top 16 which has a longitudinal slot 17 at its front end. In the bottom of the guide at a suitable distance from its front end is a slot 18. Slots 19 are in the side walls of the guide. The guide is here shown as secured to the wall 3 of a dumping wagon by means of angle iron brackets 20.

A carrier 21 is arranged for longitudinal movement in the guide and is provided with a forwardly extending and open slot 22 and also with a rearwardly extending and open slot 23. A dog 24, for engaging the ratchet wheel and to hold the latter against reverse rotation is provided at its rear end with a semi-circular lug 25 which is arranged in the slot 22 and is pivoted on a pin 26 which passes through openings 27 at opposite sides of the slot 22. The dog is hence pivotally connected to the carrier and for longitudinal movement therewith and the dog is arranged in the front end of the guide as shown in Fig. 2. To facilitate the ready disengagement of the dog from the teeth of the ratchet wheel the front end of the dog has a bevel 28 on its upper side. A detent 29 is arranged in the slot 23 of the carrier and for engagement with the slot 18. A rock shaft 30 is pivotally mounted in the openings 31 in the walls of the carrier 21, operates in the slots 19 and one end of said rock shaft projects from one side of the guide. The detent 29 is keyed to the rock shaft for operation thereby.

A lever 31 is pivotally mounted on the projecting end of the rock shaft and is provided at its free end with a weight 32. At its pivotal end the said lever is provided with a quarter circular slot 33. A set screw 34 is secured to the rock shaft and operates in the slot 33 so that the weight lever is connected to the rock shaft to turn therewith and is adapted to move vertically, independently of the rock shaft to some extent so that the jolting of the wagon over pavements will not cause the weight lever to casually disengage the detent 29 from the slot 18.

The guide is arranged in an inclined position as shown. When the weight lever is turned toward the ratchet wheel as in Figs. 1-3 it serves to hold the detent engaged with the rear end of the slot 18 thus locking the carrier in the guide and causing the carrier to hold the dog 28 engaged with a tooth of the ratchet wheel. Hence the latter and the winding shaft cannot turn reversely. If the wagon jolts the weight lever will merely play up and down independently of the rock shaft 30 and the detent 29, the slot 23 permitting this. When it is desired to disengage the detent 24 from the ratchet wheel, to enable the shaft 1 to turn and pay out the chain or for other reason, the operator with his foot turns the weight lever rearwardly and as the same swings rearwardly over the rock shaft the weight lever partly turns the latter and causes the detent to disengage the slot 18, thereby releasing the carrier 21 and the carrier by its own gravity moves downwardly and outwardly in the inclined guide and hence disengages the dog from the ratchet wheel.

In the form of our invention shown in Fig. 12 the carrier 21$^a$ to the front end of which the dog 24$^a$ is pivotally connected is provided near its rear end with a quadrant-shaped opening 35 having a vertical rear side 36 and a substantially horizontal bottom 37. The rock shaft 30$^a$ which is similar to the rock shaft 30 hereinbefore described passes through the opening 35 and is journaled in openings 19$^a$ in the walls of the guide 14$^a$, and on the rock shaft is secured a detent 29$^a$. The projecting end of the rock shaft has a weight lever such as hereinbefore described. When the weight lever is turned forwardly the detent 29$^a$ holds the carrier in such position as to engage the dog 24$^a$ with the ratchet wheel 4$^a$. When said weight lever is turned rearwardly the detent by bearing against the rear side 36 of the opening 38 moves the carrier rearwardly and thus disengages the dog from the ratchet wheel. The dog is supported clear to its free end during its engagement with the ratchet wheel.

In the modified form of our invention shown in Fig. 13 the carrier 21$^b$ is provided with an opening 38 in which is an eccentric cam 29$^b$ which is keyed to the rock shaft 30$^b$. This rock shaft is provided with a weight lever such as hereinbefore described. A dog 24$^b$ for engagement with the ratchet wheel 4$^b$ is pivotally connected to the front end of this carrier. By turning the weight lever forwardly the eccentric cam moves the carrier forwardly and causes the latter to engage the dog with the ratchet wheel by turning the weight. By turning the weight lever rearwardly the eccentric cam moves the carrier rearwardly to disengage the dog as will be understood.

In the form of our invention shown in Fig. 14 the carrier comprises a pair of toggle jointed links 39—40 which are pivotally connected together as at 41. The front end of the link 39 is pivotally connected as at 42 to the rear end of the dog 24$^c$. The rear end of the link 40 is pivotally connected to the guide 14$^c$ as at 43. The link 39 has an enlarged rear end 44. A detent 45 for engaging the enlarged end of said link is pivotally mounted as at 46 on the upper side of the guide and has a rearwardly extending rock arm 47 which has a slot 48.

A link 49 operates in openings 50 in the top and bottom of the guide, passes on one side of the link 40 and has a tappet 51 for engaging said link 40. A pedal lever 52 is pivoted as at 53 and has a slot 54 at its rear end in which operates a pivot pin 55 which projects from the rear end of the link 49. A weight lever on the pivot shaft 43 of the link 40 normally extends the toggle jointed links to cause them to engage the dogs 24$^c$ with the ratchet wheel 4$^c$. When thus arranged the detent 45 bears on the enlarged rear end of the link 39. When the operator depresses the pedal lever its rearwardly extending arm moves the link 49 upwardly thus through the instrumentality of the rock arm 47 disengaging the detent from the rear end of the link 39 of the joint and at the same time the tappet 51 of the link 49 strikes under the link 40 thus moving the pivotally connected end of the links 39—40 upwardly and hence causing them to retract the dog 34ᶜ and disengage the same from the ratchet wheel.

Having thus described our invention, we claim:—

1. In mechanism of the class described, in combination with a ratchet wheel, a carrier, a fixed support in which the carrier is slidably mounted for movement toward and from the ratchet wheel, a dog pivotally mounted on the carrier and movable therewith for engagement with and disengagement from the ratchet wheel, and means to secure the carrier against movement when the dog is in engaged position.

2. In mechanism of the class described, in combination with a ratchet wheel, a carrier, a fixed support in which the carrier is slidably mounted for movement toward and from the ratchet wheel, a dog pivotally mounted on the carrier and movable therewith for engagement with and disengagement from the ratchet wheel, and means to secure and also to actuate the carrier.

3. Ratchet wheel controlling mechanism of the class described comprising a fixed guide, a carrier mounted for longitudinal movement on the guide, a dog pivotally connected to the carrier for angular movement and also for movement therewith, an angularly movable detent element mounted in the carrier to move and secure the same and a weight lever on the pivot element of said detent.

4. Ratchet wheel controlling mechanism of the class described comprising a fixed guide, a carrier mounted for longitudinal movement on the guide, a dog pivotally connected to the carrier for angular movement and also for movement therewith, an angularly movable detent element mounted in the carrier to move the same and a weight lever on the pivot element of said detent and free to move independently thereon to a limited extent.

In testimony whereof we affix our signatures in presence of two witnesses.

MICHAEL W. GILMARTIN.
MICHAEL WOGAN.

Witnesses:
HELEN G. DALEY,
NORMAN J. SMITH.

Copies of this patent may be obtained for five cents each, by addressing the "Commissioner of Patents, Washington, D. C."